F. A. KRAUSE.
CAR TRUCK.
APPLICATION FILED APR. 12, 1912.

1,035,018.

Patented Aug. 6, 1912.

Witnesses
Wm H. Mulligan.
J W Garner

Inventor
Francis A. Krause.

By Victor J. Evans.
Attorney

UNITED STATES PATENT OFFICE.

FRANCIS A. KRAUSE, OF HINGHAM, MASSACHUSETTS.

CAR-TRUCK.

1,035,018.   Specification of Letters Patent.   Patented Aug. 6, 1912.

Application filed April 12, 1912. Serial No. 690,428.

*To all whom it may concern:*

Be it known that I, FRANCIS A. KRAUSE, a citizen of the United States, residing at Hingham, in the county of Plymouth and State of Massachusetts, have invented new and useful Improvements in Car-Trucks, of which the following is a specification.

This invention relates to improvements in railway car trucks, and consists in the construction, combination and arrangement of devices hereinafter described and claimed.

The object of my invention is to effect improvements in the construction of the wheels and axles of a railway car truck so as to provide flanged supplemental wheels on the inner sides of the track engaging wheels, the said supplemental wheels serving in the event of derailment to engage the track rails and prevent wrecks.

Another object of my invention is to provide bearing rollers carried by the truck frame and above the supplemental wheels, which bearing rollers are caused to engage the supplemental wheels and thus hold the axles in place in the event that the axles break.

Another object of my invention is to provide brake beams and shoes in use in connection with the supplemental wheels for applying the brakes.

Figure 1:
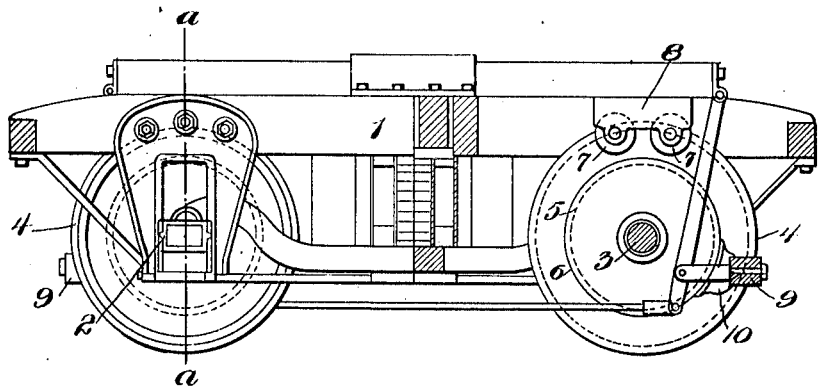
Figure 2:
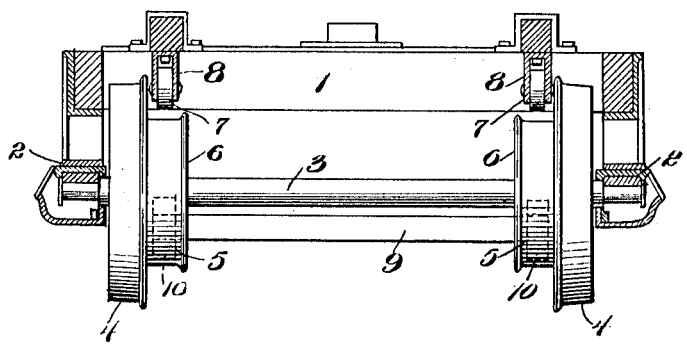

In the accompanying drawing:—Figure 1 is partly an elevation and partly a sectional view of a car truck constructed in accordance with my invention. Fig. 2 is a transverse sectional view of the same on the plane indicated by the line *a—a* of Fig. 1.

The frame 1 of the car truck may be of any suitable construction. The journal boxes for the ends of the car axle are indicated at 2 and may also be of any suitable construction. The axles are shown at 3 and the usual wheels which operate on the track rails are shown at 4.

In accordance with my invention, I provide supplemental wheels 5 which are smaller than the wheels 4 and are arranged on the inner sides thereof and concentrically on the axle. These supplemental wheels are provided with flanges 6 on their inner sides. In the event of the wheels 4 becoming derailed, one of the supplemental wheels will engage one of the track rails, so as to minimize the extent of the derailment and support the car until the train can be stopped.

Another feature of my invention is the provision of supporting rollers 7. These supporting rollers are arranged in pairs and are mounted in suitable hangers or bearings 8 which are attached to the sides of the truck frame. These pairs of supporting rollers are arranged above the supplemental wheels and are normally, entirely out of contact therewith. In the event, however, that one of the car axles should break at any point, the truck frame will drop and in so doing will cause the pairs of bearing rollers 7 to bear on the upper sides of the supplemental wheels at points in advance and to the rear of the broken axle and, hence, the said bearing rollers will coact with the supplemental wheels in holding the broken axle or the parts thereof in place and will keep the outer ends of the axle in the journal boxes and will also keep the wheels 4 in engagement with the track rails, until the train can be stopped.

The brake beams 9 of my improved truck are shorter than the usual brake beams, are arranged wholly in the spaces between the opposing inner sides of the wheels 4 and are provided with brake shoes 10 which are adapted to engage the peripheries of the supplemental wheels when the brakes are applied. Hence, the wheels 4 are entirely relieved of the stress caused by the application of the brakes and such stresses are borne by the supplemental wheels and injury to the wheels 4 by the application of the brakes is entirely avoided.

I claim:—

1. A railway truck comprising in combination with a frame having journal boxes and an axle mounted in said journal boxes and having the usual flanged engaging wheels, supplemental wheels of less diameter than and on the inner sides of the track engaging wheels, and bearing elements carried by the truck frame and arranged above and normally out of contact with said supplemental wheels, said bearing elements being applied to the upper sides of said supplemental wheels by the dropping of the truck in the event that the axle should break.

2. A railway truck comprising in combination with a frame having journal boxes and an axle mounted in said journal boxes and having the usual flanged engaging wheels, supplemental wheels of less diameter than and on the inner sides of the track engaging wheels, and pairs of bearing rollers carried by the truck frame and arranged above and normally out of contact with said supplemental wheels, said pairs of bearing rollers being applied to the upper sides of said supplemental wheels by the dropping of the truck in the event that the axle should break.

In testimony whereof I affix my signature in presence of two witnesses.

FRANCIS A. KRAUSE.

Witnesses:
 JOHN E. PEARSON,
 MICHAEL B. BURNS.

Copies of this patent may be obtained for five cents each, by addressing the "Commissioner of Patents, Washington, D. C."